Jan. 16, 1923.
H. P. KRAFT.
VULCANIZING VALVE.
FILED DEC. 17, 1914.
1,442,226.
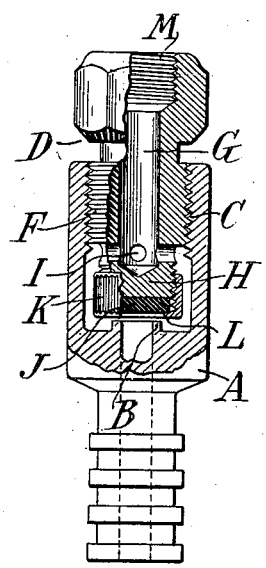
WITNESSES:
INVENTOR:
Henry P. Kraft,
By Attorneys, Patented Jan. 16, 1923.

1,442,226

UNITED STATES PATENT OFFICE.

HENRY P. KRAFT, OF RIDGEWOOD, NEW JERSEY.

VULCANIZING VALVE.

Application filed December 17, 1914. Serial No. 877,788.

*To all whom it may concern:*

Be it known that I, HENRY P. KRAFT, a citizen of the United States of America, residing in Ridgewood, in the county of Bergen and State of New Jersey, have invented certain new and useful Improvements in Vulcanizing Valves, of which the following is a specification.

This invention relates to valves for use in connection with the vulcanizing of rubber tires or like devices, and aims to provide certain improvements therein.

In the vulcanizing of tires and tire tubes it is customary to inflate the tire or tube with air and inject at the same time a certain quantity of water which is vaporized during the vulcanizing process. Trouble has been experienced in the provision of a valve which will stand the pressure involved and at the same time will not deteriorate rapidly under the heat of vulcanizing. It has been customary to use a metal valve having a metallic seat, and while such valves are efficient for a short time the repeated screwing and unscrewing of the valve upon its seat soon destroys the meeting surfaces, and leakage occurs.

The object of the present invention is to provide a valve of this character in which a soft metal or fiber packing is used, means being provided for quickly substituting a new packing as frequently as desired.

The drawing illustrating the invention shows in diametrical section, partly in elevation, an embodiment of the invention which has proven highly successful in practice.

In the drawings, let A indicate the valve casing or stem, the lower part of which is usually secured to the tire or tube by means of a rubber cot moulded on the latter. The upper part is provided with a valve seat B and beyond the valve seat a screw-threaded portion C into which the valve cap D is screwed.

The valve cap D which constitutes the valve proper is provided with a screw-threaded portion F adapted to coact with the screw-thread C to move the cap downwardly or upwardly. The valve is provided with a bore G which, however, does not extend entirely through the valve, the latter being provided with an imperforate portion H, and the bore being connected with the exterior by suitable ports I. Beneath the imperforate portion H is carried a valve packing or washer J which is adapted to make connection with the seat B.

The valve packing J may be of lead, or suitable heat resisting fiber, or other material but in any event requires frequent replacement due either to wear or to deterioration on account of the heat. I hence hold the packing in place by a screw-threaded cap or sleeve K which has a central opening of sufficient size to enable the seat B to pass through it, and a flange L underlying the edge of the packing washer and serving to hold the latter in place. When the packing becomes defective or injured, it is necessary only to screw out the member D, unscrew the sleeve K, and replace the washer.

It will be understood that in use the pipe line leading from the compressed air tank is provided with a coupling which screws into a threaded bore M, or is otherwise connected thereto, the valve being in a position in which the packing washer is raised slightly above the seat B. Fluid under pressure will hence flow through the valve and casing until sufficient pressure has been reached in the tire, whereupon a turn or less of the valve D will be sufficient to seat the washer and close the valve. The pipe line is of sufficient flexibility to permit this turning movement. The coupling is then removed, and the tire is placed in a vulcanizing oven, and after the vulcanization the valve is opened or removed and the tire emptied of its fluid.

By the present invention various advantages are accomplished. As compared with an all-metal valve, the construction is less expensive and greatly more durable. There is practically no wear on the valve casing or shell, and none on the valve proper, except at the packing which can be easily replaced.

While I have shown and described a certain embodiment of the invention, it is understood that I do not wish to be limited thereto, since various changes can be made therein without departing from the spirit of the invention.

What I claim is:—

A vulcanizing valve comprising in combination a shell which is threaded interiorly at one end and is provided at its other end with means for attaching a tube, the shell being further provided with a passage extending through the last-mentioned end and terminating in a valve seat, the engaging face of which is spaced from the adjacent portion of the shell body, a valve member having a central exteriorly-threaded portion for engagement with the threaded part of the shell, an interiorly-threaded outer end which acts as a coupling, and a closed inner end which is of reduced diameter as compared with the threaded central portion of the valve member, the latter having a central bore terminating in lateral passages adjacent to said closed inner end, a packing located against the inner end of the valve member and adapted to engage said seat, the packing extending laterally beyond the seat, and a cap having threaded engagement with the inner end of the valve member and provided with a flange engaging over said packing, the flange portion of the cap being located around the valve seat, when the valve is closed and occupying a position between the seat and the adjacent portion of the shell body, said cap being of less diameter than the threaded opening in the shell to permit removal of the valve member with the packing and cap attached.

In witness whereof, I have hereunto signed my name in the presence of two subscribing witnesses.

HENRY P. KRAFT.

Witnesses:
 E. V. MYERS,
 FRED WHITE.